Jan. 20, 1970     W. O. McKENZIE JONES     3,490,318
APPARATUS FOR PRESETTING MACHINE TOOLS

Filed Sept. 9, 1966                         9 Sheets-Sheet 1

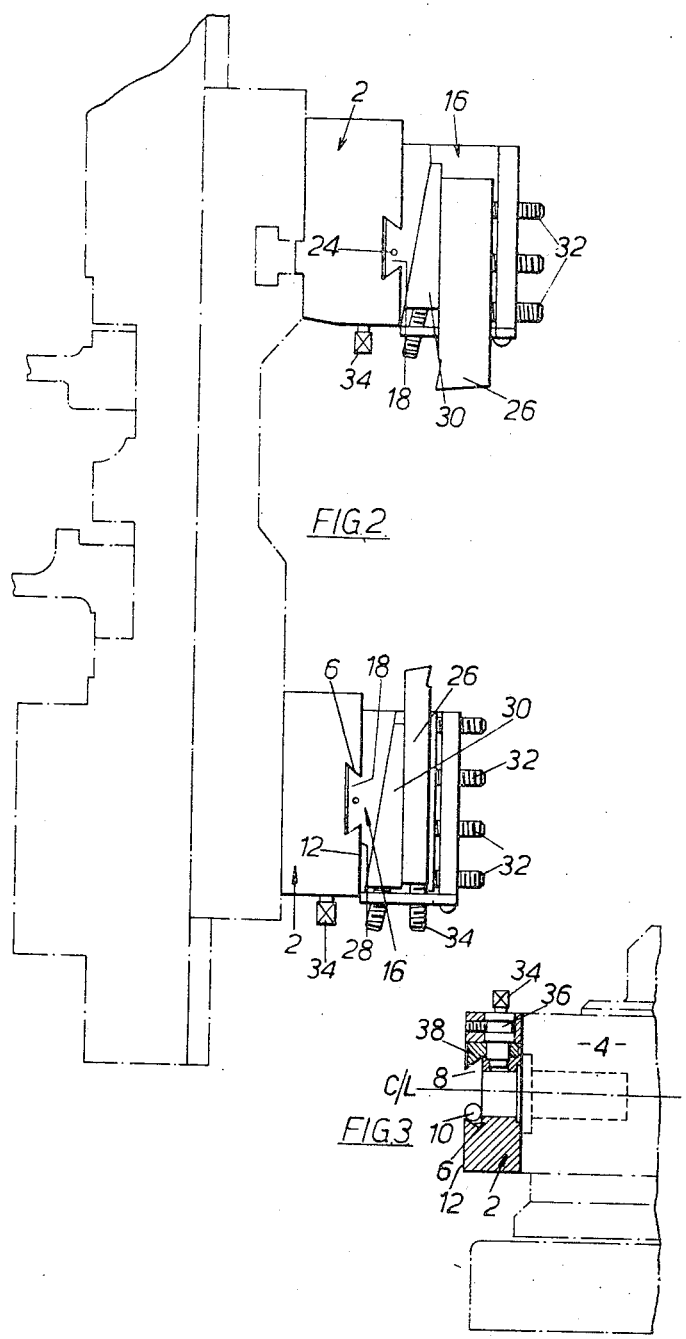

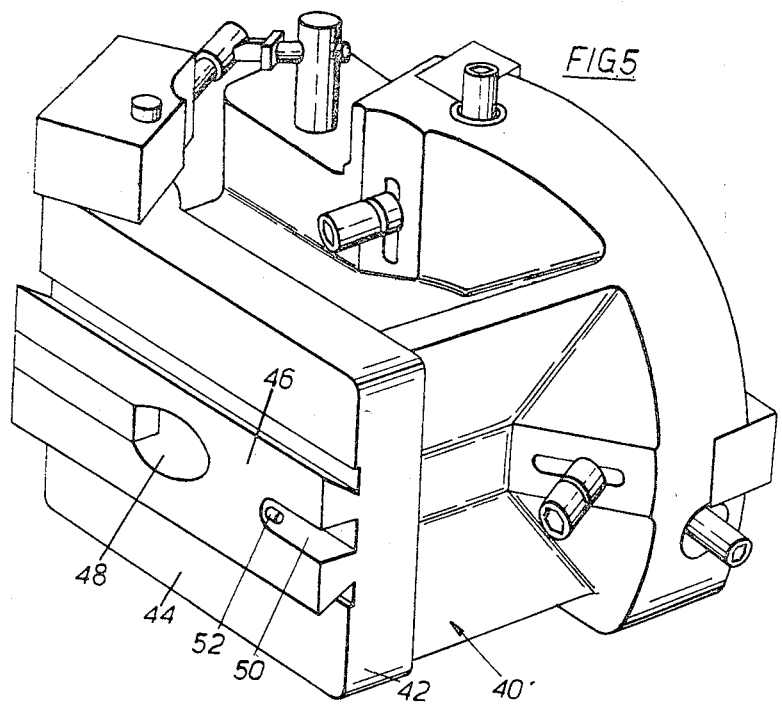
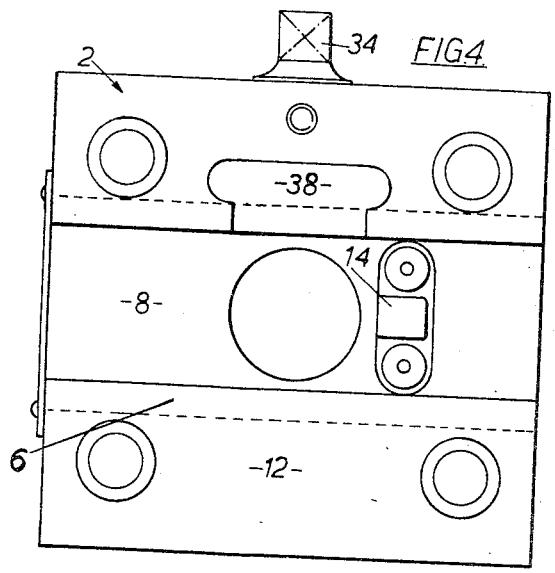

Jan. 20, 1970     W. O. McKENZIE JONES     3,490,318
APPARATUS FOR PRESETTING MACHINE TOOLS
Filed Sept. 9, 1966     9 Sheets-Sheet 4
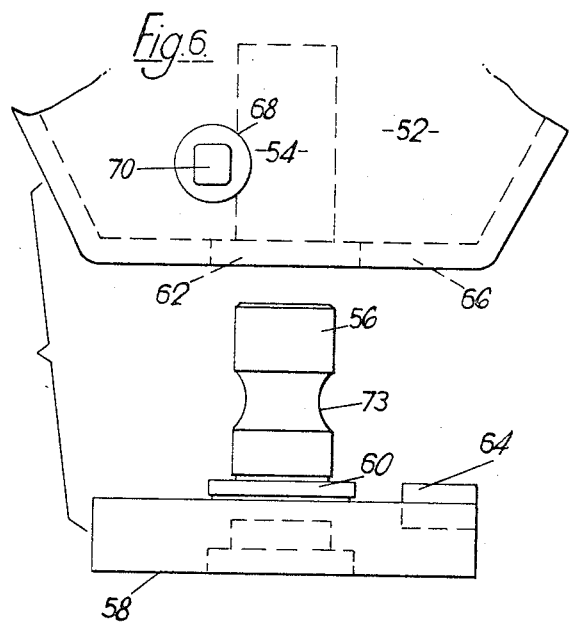
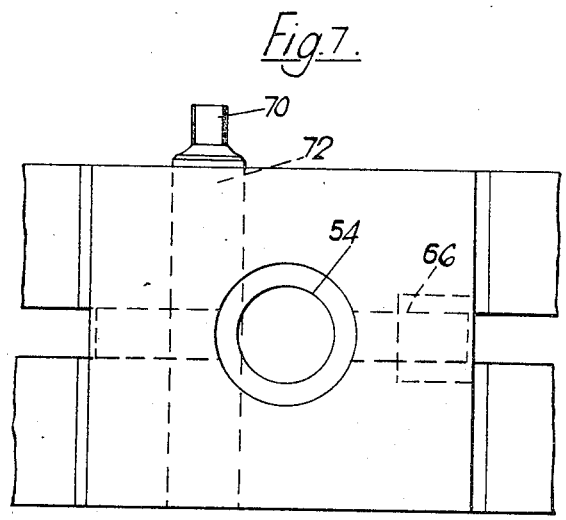

Jan. 20, 1970   W. O. McKENZIE JONES   3,490,318
APPARATUS FOR PRESETTING MACHINE TOOLS
Filed Sept. 9, 1966   9 Sheets-Sheet 5

United States Patent Office 3,490,318
Patented Jan. 20, 1970

3,490,318
APPARATUS FOR PRESETTING
MACHINE TOOLS
William Owen McKenzie Jones, Tudor Cottage 12,
Malvern Road, Maidenhead, England
Filed Sept. 9, 1966, Ser. No. 578,210
Int. Cl. B23b *3/00, 3/36;* B27g *23/00*
U.S. Cl. 82—1                                       1 Claim

ABSTRACT OF THE DISCLOSURE

A preset machine tool mounting having a dovetail engagement with a tool holder along a known location at a position determined by a stop on the machine. Set screws preset a tool with respect to the holder at two predetermined distances perpendicular to each other and to the dovetail. A set screw on the holder engages the stop and may be adjusted for exact three-dimensional location of the tool.

---

This invention relates to the mounting of tools on machine tools.

Hitherto it has been necessary to set up tools relatively, to a workpiece to be machined, actually on the machine tool itself. This has led to long unproductive periods when the machine tool has been in-operative especially in the case of turret or capstan lathes or in the case of multi-spindle lathes where a comparatively large number of tools have had to be set up.

It is an object of the invention to provide a method of setting up tools on a machine tool for a machining operatin comprising the steps of setting up the tool in its holder or base or in a tool carrying member, in a position remote from the machine tool, at a predetermined position from three reference planes or surfaces on the holder, base or member and then mounting the holder, base or member on the machine tool in a known pre-arranged position relatively to the centre line of the chuck or spindle drum of the machine tool and to a plane along the centre line e.g. the parting-off line. Thus as the distances of the three reference planes or surfaces on the tool carrier from the centre line of the machine tool are known when the carrier is mounted in its prearranged position a tool can be preset accurately away from the machine tool relatively to these reference planes and when the carrier is mounted on the machine tool, the tool will be correctly set up for a machining operation.

It is a further object of the invention to provide a machine tool having on each tool mounting face means for receiving a tool carrying member or tool base and for locating said members or bases at an equal distance horizontally and vertically from the centre line of the chuck or spindle drum and horizontally from a plane along the centre line e.g. the parting-off line. In this way any tool carrier can be mounted on any face and will always be at the correct distance from the piece to be machined. Hence if the machine tool is a capstan or turret lathe the preset tool can be mounted on any one of the faces of the turret.

The tool may either be set relatively to reference planes in its own base or it can be set in a tool carrier having means for adjustably presetting a tool in a predeterminable tool position corresponding to a machining position when the carrier is mounted in its prearranged position on the machine tool.

The machine tool may either be provided with a mounting member to receive the tool carrier or it may be formed integrally with means to receive the carrier. Preferably the mounting member or body of the machine tool is formed with one portion e.g. the female portion of a dovetail joint and the tool base or separate tool carrier with a corresponding dovetail portion e.g. the male portion. The dovetails on the machine tool or mounting member may be arranged either vertically or horizontally but it is preferred that they be arranged with their axes horizontal. A stop is provided either on the mounting member and/or the machine tool to limit horizontal movement of one dovetail portion relative to the other.

Preferably the stop or one of the stops is adjustable along the length of the dovetail portion so that the positioning of the tool on the machine tool may be predetermined.

In one convenient arrangement the mounting member has a fixed stop projecting outwardly into its dovetail groove and the tool or tool carrier has a groove in its male dovetail portion corresponding to the position of the fixed stop, the groove having a movable end stop.

By the use of this invention a tool can be preset and the stop or stops preset so that when the tool is positioned on the machine tool or its mounting member using the stop or stops, the tool is accurately set in its working position relative to the workpiece.

The assembly is particularly useful for capstans or turret lathes, the turret being supplied with a number of mounting members, the transverse position of the tools relative to the centre line of the workpiece holder being determined by the stops and by the positioning of the tool relative to the known position of the stop on the tool location member.

The three reference planes or surfaces on the tool carrier are provided by one side of the dovetail, the end stop and the flat face of the block which engages against the flat face of the mounting block on the machine tool.

It will be realised that as the faces of a turret on a normal lathe are not made sufficiently accurate and are not dead square, the use of mounting blocks which can be individually prepared for each face is particularly advantageous. The cross slides as well as the turret can of course be provided with mounting blocks to receive preset tools.

As an alternative to the use of a mounting member on the machine tool, the machine tool body may be provided with location means designed to mate with corresponding location means on the body of a tool for a machine tool or on a carrier block designed to hold a tool.

The location means on the body of the machine tool may comprise a bore or pin to mate with a very small tolerance (e.g. $\frac{2}{10,000}''$) with a corresponding pin or bore on the tool or tool carrier and a pin or tenon to mate with a groove or slot on the tool or tool carrier to prevent angular movement. Alternatively the groove may be formed in the body of the machine tool and the tenon or pin on the tool or tool carrier.

A further form of location means is a spline.

The locking means to hold the tool or tool carrier in position may, for example, comprise an eccentric or cam which on turning of a screw engages a groove in the pin when this is located in its bore. Clearly however any other form of locking device to hold the two members i.e. the tool or tool carrier and the machine tool, together, could readily be designed.

The turret, capstan, tool post or the like of the machine tool or an "intermediate" member designed for mounting thereon (all of which will hereafter for convenience be referred to as the "machine part") may be formed with either a slot or a member for sliding in a slot and the tool or a holder therefor is formed with a corresponding member or slot respectively, a stop being provided on either the tool or tool holder or the machine part to limit movement of the member in the slot, the arrangement being such that when the member is in the slot and movement has been arrested by the stop, the tool or holder is accurately set on the machine in the direction of the slot, the machine part and the tool or tool holder having cooperating locating means to prevent relative movement in a direction perpendicular to that of the slot and also to prevent relative angular movement, locking means being provided to lock the tool or tool holder to the machine part.

Thus the tool can be preset in its holder or it can be adjusted and preset within its own body and relatively to the location means, apart from the machine tool and when locked in a position on the machine tool predetermined by the position of the stop end of the co-operating means, it will accurately be set for a machining operation. This saves having to set the tools on the machine tool and this leads to a very material saving in the "idle" or non-working time of a machine tool.

The locating means may comprise a groove on the machine part, a corresponding groove on the tool or tool holder and a bar or the like accurately machined to fit precisely in the two grooves. Alternatively the bar or the like could be provided as a projection on the machine part or the tool or tool holder to mate with a corresponding groove in the tool or tool holder or the machine part respectively.

The locking means may comprise an eccentric carried on a spindle mounted in the machine part or tool or tool holder and arranged on turning of the spindle to pull the slide member against a wall of the slot.

The slide member is conveniently provided with a head projecting outwardly from a shank and the slot is shaped so that the head is received behind a shoulder over only a part of the length of the slot. In this way the slide member and hence the tool or tool holder can be withdrawn from the machine part through the unshouldered parts of the slot, in a direction perpendicular to that of the length of the slot, thus helping to achieve easy location of the tool in, and removal from, the machine.

Embodiments of the invention will now be described by way of example with reference to the accompanying drawings in which:

FIGURE 2 is an end elevation looking in the direction of the arrow A—A of FIGURE 1;

FIGURE 3 is a section on the line III—III of FIGURE 1;

FIGURE 4 is a plan view of the mounting member;

FIGURE 5 is a perspective view of a tool having an integrally formed connection member;

FIGURE 6 is a diagram illustrating one form of location means formed integrally on a turret of a lathe;

FIGURE 7 is an end elevation of the portion of the machine tool turret shown in FIGURE 6;

Figure 1:
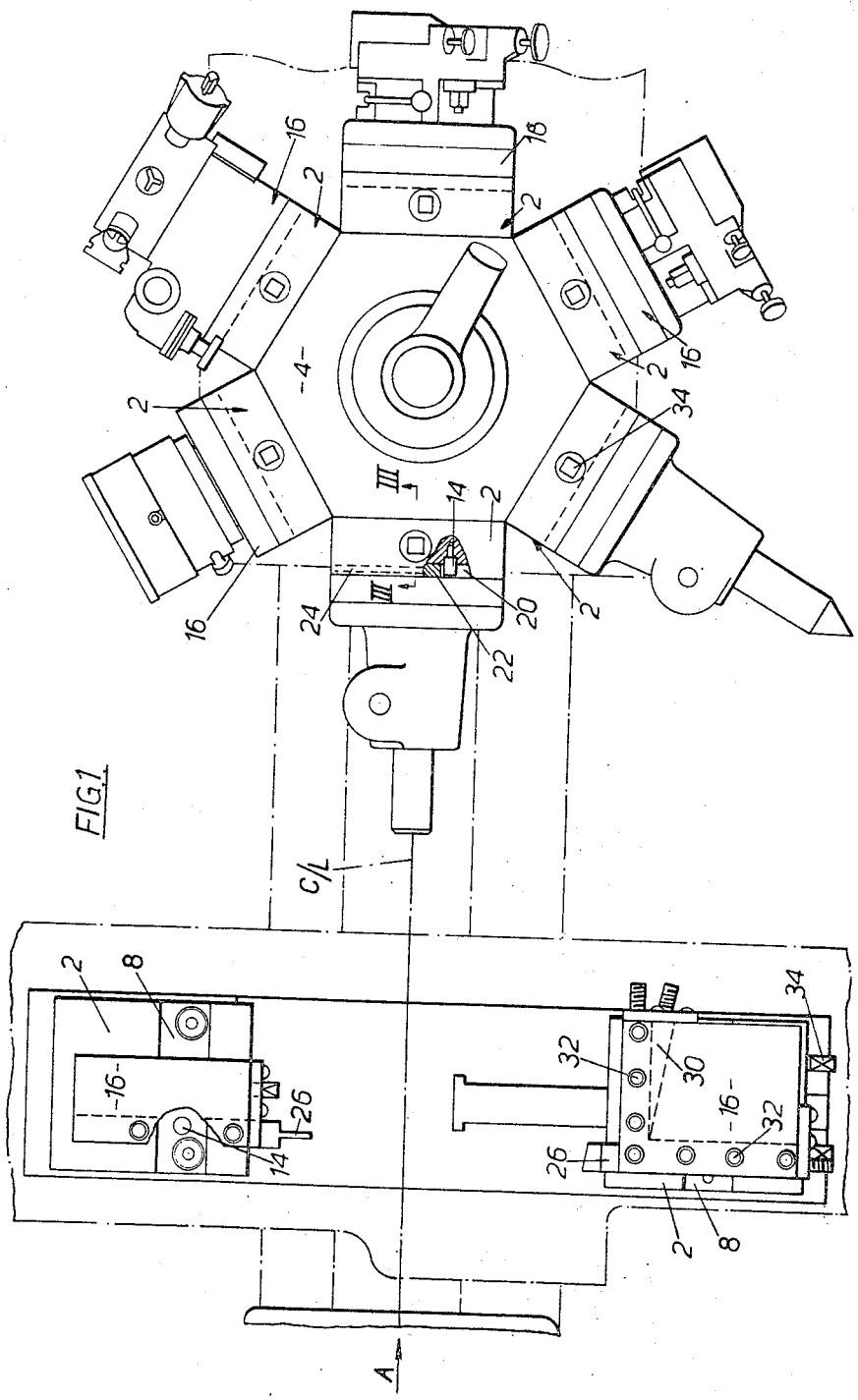
FIGURE 1 is a plan view of the turret of a capstan lathe having a preset tool mounting assembly.

Referring to FIGURES 1—4 six tool members generally shown at 2 are secured around the turret 4 of the lathe and a similar member is secured to each cross slide. The members are accurately postioned so that the distance between the reference surfaces provided by the face 6 of each horizontally disposed dovetail groove 8 in the members, and the centre line of the spindle, is very accurately measured using a ball 10 of known diameter (see FIGURE 3) and the members are set so that this dimesion is constant for each face of the turret. Equally the distance between the face 12 and a reference plane along the centre line ($C/L$) of the spindle is accurately set to a predetermined value. The third reference surface is provided by a stop 14 projecting outwardly from the inner surface of the groove 8, the stop being set at predetermined distance from the machine centre line.

While the mounting member is shown in the drawing as being separated from, but secured to, the body of the machine tool, it will be appreciated that the member could be incorporated in the tool i.e. the dovetail could be machined directly into the solid body of the turret.

The tool carrier 16 is formed with a projecting male dovetail portion 18 which engages in the dovetail groove of the mounting member so that the tool carrier and the mounting member can be engaged or disengaged by relative horizontal sliding movement of the two dovetail portions.

The male dovetail member is provided with an open ended groove 20 to accommodate the stop 14 and the end of the groove is provided by an adjustable stop member 22 whose position is adjustable on turning of a screw 24.

The tool carrier has reference planes or surfaces corresponding to the surfaces on the mounting block namely one side of the male dovetail portion 18, the end stop 22 and the face 28 which abuts the face 12 of the mounting member when the carrier is mounted on that member. Hence if a tool 26 is set up in the carrier the distances from these reference planes which its cutting edge should lie can be calculated so that when the tool is in its carrier and the carrier is on any of the mounting members, the tool will be correctly set up relatively to the workpiece.

The positioning of the tool in the carrier which takes place at a position away from the machine tool may be carried out by mounting the carrier on a block simulating a mounting block on the machine tool, the tool 26 is inserted and set accurately in a position in which it lies at predetermined distances from the reference surfaces, by means of an adjustable wedge 30 (see FIGURE 2) screws 32 and on adjustable end stop 34.

It will be appreciated that a tool such as those shown in FIGURE 2 can be secured to the carrier in a very accurately predetermined position relative to the carrier and then the carrier secured to the mounting member on the turret in a very accurately predetermined position relative to the workpiece. Hence the adjustment of a tool carrier can be done apart from the machine tool and when it is desired to change a tool on the machine this can be done very quickly and easily and without any accurate setting needing to be done at this time when the machine tool is not being used.

When the male dovetail portion is engaged in the female, the two portions can be locked together by turning of a lug 34 projecting upwardly from the mounting member. This action turns a spindle 36 which has a cam surface which acts to move the upper edge 38 of the female dovetail portion downwardly to grip the male portion on the carrier member.

Instead of mounting the tool in a carrier the tool itself may have an integrally formed dovetail portion as is illustrated in FIGURE 5 which is a standard roller steady box tool for a lathe such as a capstan or turret lathe. The tool has a body 40 having an integral base 42. The base has an outer face 44 accurately machined thereon corresponding to the face 28 of the carrier. The face 44 has a location member in the form of a male portion 46 of a dovetail joint which is machined horizontally across the entire face.

The dovetail portion 46 has a central hole 48 extending through the body 40 to the working face of the tool and through which the workpiece may extend when necessary, and an end milled slot 50. The inner end of the slot 50 is defined by a movable stop in the form of a screw 52 which screw-threadedly engages in a hole which extends to the central hole 50 so that if it is an Allen screw it can be adjusted by the use of a crank-type socket spanner from the hole 48. The stop 52 corresponds to the stop 22 of the tool carrier.

In use the tool itself is set apart from the machine tool, and relative to the face 44 and a face of the male dovetail 46 in such a way that when the tool is located in position on the mounting member 2 of the machine tool it will be accurately set relative to the centre line of the chuck. As the position of the fixed stop 14 is accurately known the horizontal position of the tool is determined by the position of the movable stop 52 which, when the dovetail portions mate, engages the fixed stop 14 or the mounting member, the fixed stop sliding through the groove 50 until it engages the screw. Since all the presetting operations can be carried out on the tool apart from the machine tool or its mounting member, the idle or stoppage time of the machine tool can be very substantially cut as compared with tools used hitherto when it was necessary to set up the tools on a machine tool between machine's operation.

As a modification the body of the machine tool may itself be formed or provided with location means and the body of a tool or tool carrier with corresponding location means. Referring to FIGURES 6 and 7, each face of the turret generally shown at 52 of a capstan lathe is formed with a location means in the form of a bore 54 which is a very close fit with a corresponding location means in the form of a pin 56 projecting from the face of a plate 58 which can form part of, or be secured to a tool or tool carrier. The base 60 of the pin is of larger diameter to mate with a corresponding recess 62 on the turret.

Engagement of the pin in the bore accurately locates the tool or tool carrier both horizontally and vertically relatively to the turret face and hence relatively to some reference plane on the machine e.g. the centre line of the chuck as described hereinbefore. Angular location is achieved by the engagement of a tenon member 64 projecting from the plate 58 in a slot 66 in the turret.

The play between the pin and bore and between the tenon and the sides of the groove should be less than $\frac{2}{10,000}''$ for example to achieve the necessary degree of accuracy in the positioning of the tool.

Figure 8:
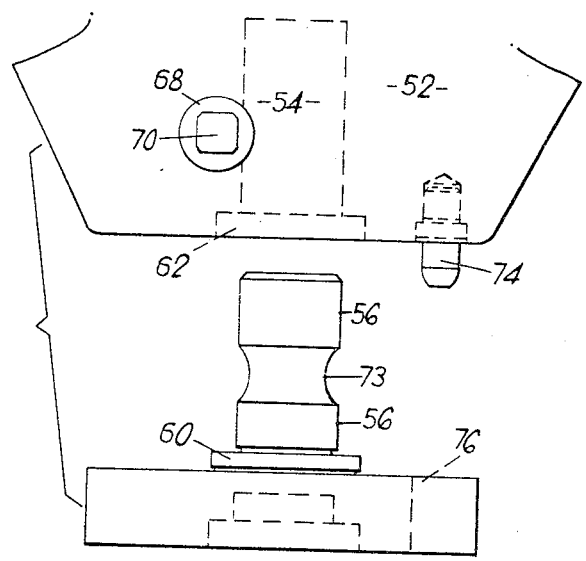
FIGURE 8 is a diagram illustrating an alternative form of location means on a turret of a lathe.
Figure 9:
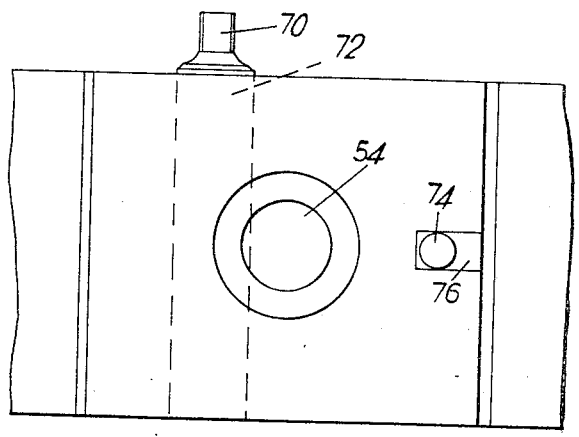
FIGURE 9 is an end elevation corresponding to FIGURE 8.

Once the pin and tenon are engaged in the bored slot the tool or tool carrier is locked to the turret in its located position by means of an eccentrically mounted "cam" member 68 which, on turning of the head 70 of a screw 72 to which it is connected, extends across the bore 54 to engage in a groove 72 formed around the periphery of the pin 56. It can only be so engaged when the pin is correctly engaged in the bore. The location and locking means of the arrangement shown in FIGURES 8 and 9 are identical to those shown in FIGURES 6 and 7 except that angular location is achieved by the engagement of a dowel pin 74 projecting from the turret face, in a slot 76 formed in the plate 58.

Clearly the pin 56 could extend from the turret and the bore 54 be formed in the tool or tool carrier.

Again a tool can be preset apart from the machine tool in its own housing, or alternatively preset in a tool carrier and then secured to the turret of the capstan lathe in the pre-determined position when it will be accurately positioned relatively to reference lines or planes of the lathe.

Figure 10:
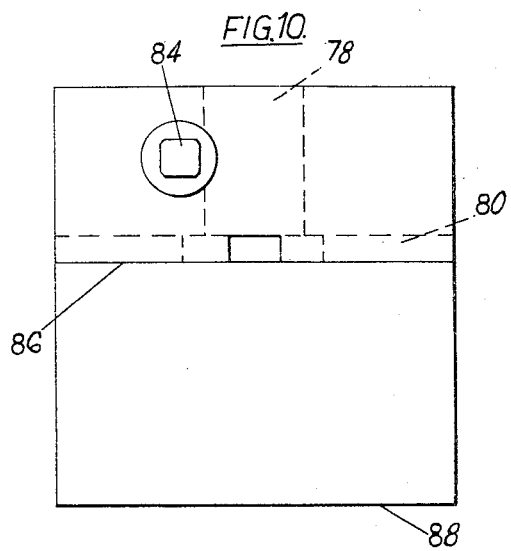
FIGURES 10 and 11 are a side and end elevation respectively of a presetting unit for the tool or tool carrier shown in FIGURES 6 and 7.
Figure 11:
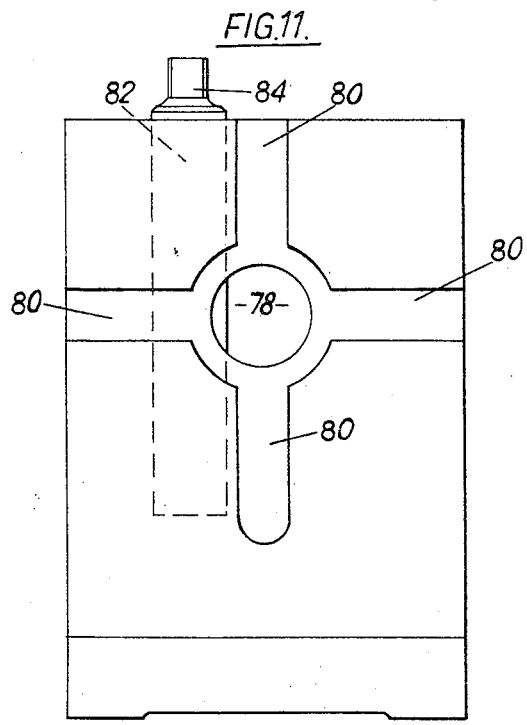

The unit shown in FIGURES 10 and 11 is intended for use with the tool holder shown in FIGURES 6 and 7 and comprises a block formed with a bore 78 identical to the bore 54 of the lathe turret and two slots 80 at right angles to each other and of identical width to the slot 66 of the turret. Hence the pin 56 of the tool or tool carrier can be inserted into the bore 78 and the tool positioned angularly at any of four positions at 90° with the tenon 64 engaging in a slot 80. A cam arrangement 82 identical to the cam 72 of the lathe is then turned by a nut 84 to lock the tool or tool carrier to the machine tool.

The height of the front face 86 of the block from the base plane 88 is known so that the tool can be set relatively to the plane 88 and hence the plane 86 which means that it is being set relatively to the face of the lathe turret and hence the reference planes of the lathe e.g. the centre line of the chuck.

Figure 12:
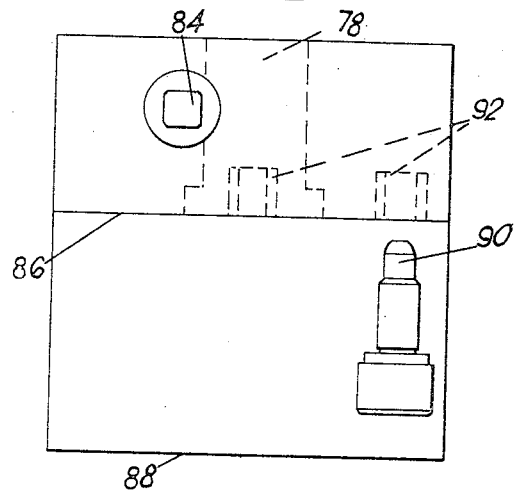
FIGURES 12 and 13 are a side and end elevation respectively of a presetting unit for the tool or tool carrier shown in FIGURES 3 and 4.
Figure 13:
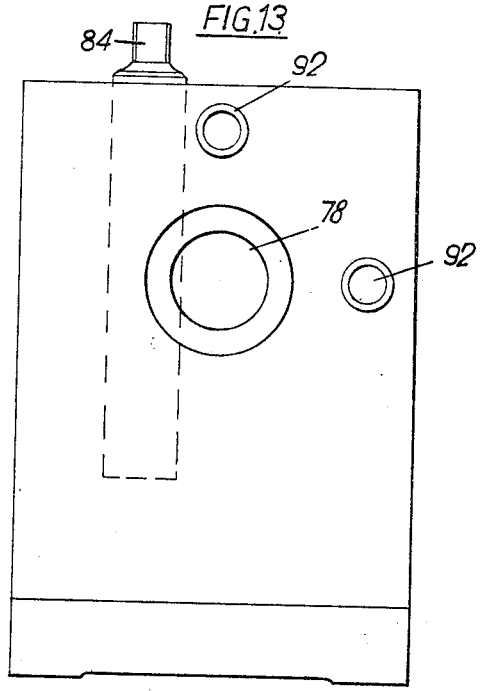

The unit shown in FIGURES 12 and 13 corresponds to that described with reference to FIGURES 10 and 11 and is used in the same way. However instead of the slots 80 it is provided with a dowel pin 90 identical in diameter to the pin 74 on the lathe turret shown in FIGURES 8 and 9 and the dowel pin may be removable as indicated in FIGURE 12 and the block provided with a number of holes 92 at different angular positions so that the dowel pin can be inserted into the appropriate hole to engage the slot 26 with the tool depending at the desired angular position from the tool or tool carrier during presetting.

As a further modification the construction shown in FIGURES 14 to 17 can be adopted. The arrangement shown in FIGURE 14 comprises a tool holder 94 connected to the turret 96 of a lathe by means of an intermediate member 98.

The intermediate member 98 is "permanently" attached to the turret 96 and carries a T-shaped slide member 100 which is engaged in a corresponding slot 102 in the holder 94. The T-shaped member 100 also acts to lock the holder 94 to the intermediate member which is moved bodily to the left, i.e. into close contact with the intermediate member, on the rotation of a cam 104 on a spindle 106.

The intermediate member is provided with a stop member (not shown) against which the tool or tool holder abuts in order to locate it in a transverse direction, i.e. in the direction of the slide.

The tool holder 94 is located vertically and angularly on the intermediate block by means of a square bar 110 which is mounted on the intermediate block 98 with one of its diagonals in line with the face 108 between the intermediate block and the tool holder. The bar 110 is engaged in an accurately machined groove 112 on the tool holder.

In use, the slot 102 on the tool holder is engaged on the T-shaped member 100 and the tool holder is slid sideways across the face 108 of the intermediate block until it abuts the stop which locates the tool holder transversely. The vertical and angular location is achieved by the engagement of the bar 110 in the groove 112. The tool holder is then clamped by rotating the spindle 106 which causes the T-shaped member to pull the tool holder bodily towards the intermediate member; this movement also drives the bar fully into the groove for accurate location.

Figure 15:
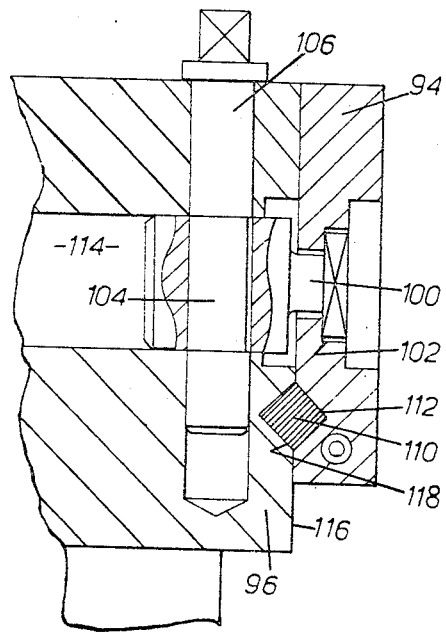
FIGURE 15 is a sectional side elevation of a tool holder mounted directly on the turret of the lathe.

In the arrangement shown in FIGURE 15 the tool holder 94 is connected directly to the turret 96 of a lathe.

The turret has been drilled to accept the spindle 106 and the shank of the T-shaped member is fitted in a centre hole 114 of the turret face 116. This face is formed with a groove 118 corresponding to the groove in the intermediate member shown in FIGURE 14.

Figure 14:
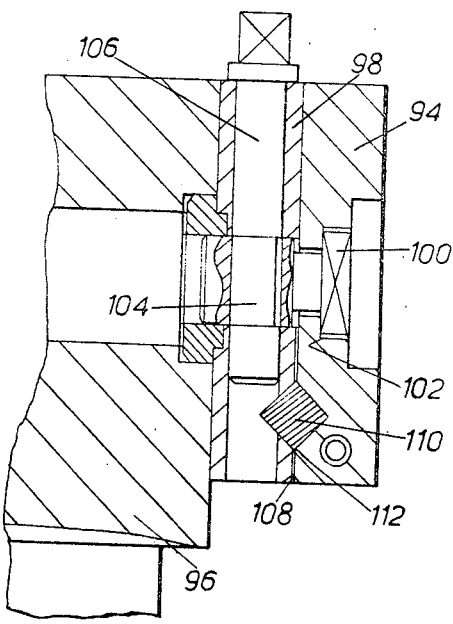
FIGURE 14 is a sectional side elevation of a further embodiment of a tool holder mounted on a turret of a lathe by means of an intermediate member.

The construction and operation of the parts is similar to that of the one shown in FIGURE 14 and described above.

An advantage of the construction shown in FIGURE 15 is that the tool can be positioned closer to the turret and take less machining space. It is especially suitable for round turret heads which in practice will have a flat milled thereon of sufficient size to give accurate location.

Figure 16:
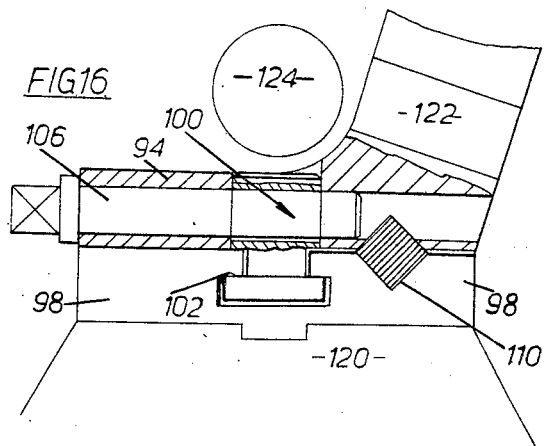
FIGURE 16 is a sectional side elevation of a tool holder mounted on a capstan of a multi-spindle lathe by means of an intermediate member.

In the arrangement shown in FIGURE 16 the intermediate member 98 is attached to the capstan 120 of a multi-spindle lathe in the usual way, and the tool holder 94 which is adapted to hold a cutting tool indicated at 122 to machine a workpiece 124 is drilled to accept the spindle 106. The shank of the T-shaped slide member is mounted in the tool holder 94 and it engages in the slot 102 on the intermediate member 98. The location bar 110 is mounted on the intermediate member which is also provided with an end stop (not shown). Otherwise the operation of this tool mounting is similar to that described above with reference to FIGURE 14.

The arrangement shown in FIGURE 16 is especially suitable for mounting a tool or tool holder on a tool post located, for example, on a cross slide of a capstan or turret lathe.

Figure 17:
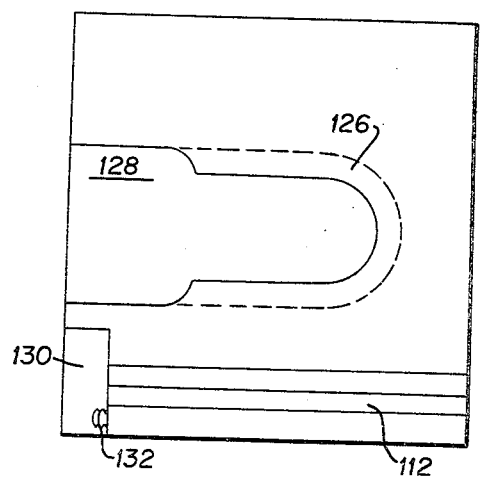
FIGURE 17 is a plan view of a suitable slot for use on either the tool holder, machine part or the intermediate member.

The slot 102 in each of the embodiments shown in FIGURES 14–16 is conveniently of the shape shown in FIGURE 17.

The open ended slot 102 is formed with a shoulder 126 behind which the head of the T-shaped slide member 100 engages when in the set position. The outer position 128 of the slot is sufficiently wide to allow the head of the member to pass therethrough. The slide member can then be removed from the slot in a direction perpendicular to that of the slot so as to avoid having to move the tool sideways to an extent to clear the slot which would lead to probable fouling with tools on adjacent faces of the turret.

The slotted block is recessed at 130 to clear the end stop and a screwed pin 132 is provided to form the abutment on the block.

If desired the bar and grooves may have different shapes from that shown. For example, the bar could be circular or the inner position of the bar can be rectangular and mounted as a very close sliding fit in a slot in the member in which it is mounted. A grommet can be provided between the bore of the slot and the base of the rectangular position of the bar so as to take up a shank when the parts are locked together. The projecting position of the bar may again be similar to that shown in FIGURES 14–16.

It will be appreciated that the location of reference surfaces on the machine tool or on the intermediate block or member are set relatively to for example the centre line of the spindle and the parting-off line as has been described in detail hereinbefore so that if a tool is correctly set up in its carrier 94 relatively to reference planes on the carrier then when the carrier is mounted on the turret or on the intermediate member the tool will be correctly set up relatively to the workpiece.

The use of the invention is as applicable to multi-spindle lathes as it is to capstan or turret lathes.

It must be realised that if the reference surfaces or for example the mounting members of a number of lathes are set at equal distances from the reference planes of the various lathes then tools or tools in their carriers will not only be interchangeable among for example the various turret faces of one lathe but will also be interchangeable at will among all the lathes and will be correctly set up for a machining operation on whatever lathe it is mounted.

I claim:
1. A tool mounting for preset tools on a machine tool, comprising in combination; a tool holder; slide means for mounting said holder on said machine, said slide means being at a known location with respect to said machine, said slide means being provided by a dovetail engagement between said machine and tool holder, the female member of said dovetail engagement being provided on said machine, the male member of said dovetail engagement being on said tool holder; a stop means of known location on said machine for positioning of said holder along said slide means, said stop means being located within said female member, said male member including a longitudinal groove for reception of said stop means, said groove parallel to the direction of said dovetail engagement and having an inside end perpendicular thereto; a preset tool mounted in said holder at two predetermined distances perpendicular to each other and relative to the direction of said longitudinal groove; adjustment means on said holder for adjustment of said tool with respect to said holder at said predetermined distances perpendicular to each other and to said dovetail engagement, respectively; and adjustable stop means on said holder for engagement with said stop means at a predetermined position for exact 3-dimensional location of said tool on said machine tool, said adjustable stop means being provided by a set screw at said inside end of said groove allowing adjustment longitudinally of the dovetail engagement and perpendicular to said two distances.

References Cited

UNITED STATES PATENTS

| 556,415 | 3/1896 | Hartness | 82—36 XR |
| 1,013,129 | 1/1912 | Clarke | 82—36 XR |
| 2,621,396 | 12/1952 | Gracchi | 82—36 XR |
| 3,191,470 | 6/1965 | Pabst et al. | 82—36 |
| 3,252,202 | 5/1966 | Bullard et al. | 33—185 XR |
| 3,271,848 | 9/1966 | Montandon | 82—34 XR |
| 3,292,267 | 12/1966 | Wilterdink et al. | 77—1 XR |

FOREIGN PATENTS

| 1,091,194 | 10/1954 | France. |
| 804,371 | 11/1958 | Great Britain. |
| 119,530 | 4/1927 | Switzerland. |

LEONIDAS VLACHOS, Primary Examiner

U.S. Cl. X.R.

29—35.5; 33—185; 82—34